(12) United States Patent
Goodsitt et al.

(10) Patent No.: US 11,237,895 B2
(45) Date of Patent: Feb. 1, 2022

(54) SYSTEM AND METHOD FOR MANAGING SOFTWARE ERROR RESOLUTION

(71) Applicant: Capital One Services, LLC, McLean, VA (US)

(72) Inventors: Jeremy Goodsitt, Champaign, IL (US); Reza Farivar, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 147 days.

(21) Appl. No.: 16/801,470

(22) Filed: Feb. 26, 2020

(65) Prior Publication Data

US 2021/0263791 A1 Aug. 26, 2021

(51) Int. Cl.
| | |
|---|---|
| *G06F 9/44* | (2018.01) |
| *G06Q 10/06* | (2012.01) |
| *G06F 11/36* | (2006.01) |
| *G06F 11/07* | (2006.01) |
| *G06F 3/0484* | (2013.01) |
| *G06F 11/34* | (2006.01) |

(52) U.S. Cl.
CPC ...... *G06F 11/0775* (2013.01); *G06F 11/0772* (2013.01); *G06F 11/0781* (2013.01); *G06F 11/0784* (2013.01); *G06F 11/3476* (2013.01); *G06F 11/3636* (2013.01)

(58) Field of Classification Search
CPC ............. G06F 11/0775; G06F 11/0772; G06F 11/0781; G06F 11/0784; G06F 11/3476; G06F 11/3636; G06F 8/20; G06F 8/10; G06F 8/51; G06F 3/0484; G06F 3/04842
See application file for complete search history.

(56) References Cited

U.S. PATENT DOCUMENTS

| | | | |
|---|---|---|---|
| 7,464,366 B2 | 12/2008 | Shukla et al. | |
| 7,958,486 B2 | 6/2011 | Tsyganskiy et al. | |
| 9,275,358 B1 * | 3/2016 | Yap ........................ | G06Q 10/06 |

OTHER PUBLICATIONS

Khatun et al., A bug assignment technique based on bug fixing expertise and source commit recency of developers, 6 pages (Year: 2016).*

(Continued)

*Primary Examiner* — Thuy Dao
(74) *Attorney, Agent, or Firm* — Bookoff McAndrews, PLLC

(57) ABSTRACT

A computer-implemented method may include: receiving first data that may include information associated with an error in an execution of code; based on the first data, determining: for each contributor in a predetermined list of contributors: a respective familiarity value indicative of an amount of association between the contributor and the error in the code; and a respective set of task management statistics; and an urgency value of the error; using an optimization model, selecting at least one contributor from the predetermined list of contributors to assign to the error, the optimization model based on the respective familiarity values and the respective sets of task management statistics for each contributor, and the urgency value of the error; and transmitting a notification indicative of the error to a computing device associated with the at least one contributor assigned to the error.

20 Claims, 3 Drawing Sheets

(56) References Cited

OTHER PUBLICATIONS

H. Kagdi et al., "Who Can Help Me with this Change Request?," 2009 IEEE 17th International Conference on Program Comprehension, 2009, pp. 273-277, doi: 10.1109/ICPC.2009.5090056.
John Anvik, "Automating Bug Report Assignment," 28th International Conference of Software Engineering (ICSE 2006), Department of Computer Science, University of British Columbia, pp. 937-940.
H. Kagdi et al., "Who Can Help Me with This Source Code Change?," Proceedings of the IEEE International Conference on Software Maintenance, 2008, Institute of Electrical and Electronics Engineers (IEEE), 2008, pp. 157-166.
Yutaro Kashiwa et al., "A Release-Aware Bug Triaging Method Considering Developers' Bug-Fixing Loads," IEICE Transactions on Information and Systems, vol. E103-D, No. 2, Feb. 2020, pp. 348-362.
International Search Report and Written Opinion in corresponding Application No. PCT/US2021/019645, dated Jun. 14, 2021 (16 pages).

\* cited by examiner

SYSTEM AND METHOD FOR MANAGING SOFTWARE ERROR RESOLUTION

TECHNICAL FIELD

Various embodiments of the present disclosure relate generally to systems and methods for managing software error resolution, and more particularly to methods and systems for optimizing assignment of contributors to address errors in software.

BACKGROUND

Software development and support, especially when involving the work of multiple contributors, may be very complex. Tools have been developed to address such complexity, and/or to express software development issues in ways that are human-understandable. For example, version control tools have been developed in order to track how software code has been changed, by whom, and when. Debugging tools have been developed in order to facilitate identifying portions of computer code contributing to an error. However, familiarity and experience with portions of code in a project, as well as techniques for addressing errors, may vary greatly from contributor to contributor.

Given that each contributor also may have their own time commitments and responsibilities, finding a particular contributor with time available as well as familiarity and/or experience with an error in a portion of code may be difficult. Moreover, this problem may be quickly compounded, since many contributors may be working on more than one project or portion of code simultaneously, and because more than one error in various portions of code may also arise simultaneously.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for managing software error resolution. Each of the examples disclosed herein may include one or more of the features described in connection with any of the other disclosed examples.

In one example, a method for managing debugging may include: monitoring execution of a code to detect an error in the code; in response to the monitoring detecting the error in the code, initiating an error resolution process to identify one or more contributors to address the error, the error resolution process including: obtaining information associated with the error; obtaining revision history for the code from a version control system; obtaining a predetermined list of contributors associated with the code; obtaining task management statistics information for the predetermined list of contributors from a task management system; obtaining an urgency value for the error; and analyzing the information associated with the error, the revision history, the task management statistics, and the urgency value to determine the one or more contributors to address the error; generating an error report for the error; and transmitting the error report to the identified one or more contributors.

In another example, a system for managing debugging may include: a memory storing instructions; and a processor executing the instructions to perform a process. The process may include: monitoring execution of a code to detect an error in the code; in response to the monitoring detecting the error in the code, initiating an error resolution process to identify one or more contributors to address the error, the error resolution process including: obtaining information associated with the error; obtaining revision history for the code from a version control system; obtaining a predetermined list of contributors associated with the code; obtaining task management statistics information for the predetermined list of contributors from a task management system; obtaining an urgency value for the error; and analyzing the information associated with the error, the revision history, the task management statistics, and the urgency value to determine the one or more contributors to address the error; generating an error report for the error; and transmitting the error report to the identified one or more contributors.

In a further example, a method for managing debugging may include: monitoring execution of a code to detect an error in the code; in response to the monitoring detecting the error in the code, initiating an error resolution process to identify one or more contributors to address the error based on revision history associated with the code, the error resolution process including: analyzing, by performing a ranking process or using a ranking machine learning model, the revision history, task management statistics for a predetermined list of contributors, and an urgency value to determine the one or more contributors to address the error; generating an error report; and transmitting the error report to the identified one or more contributors.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
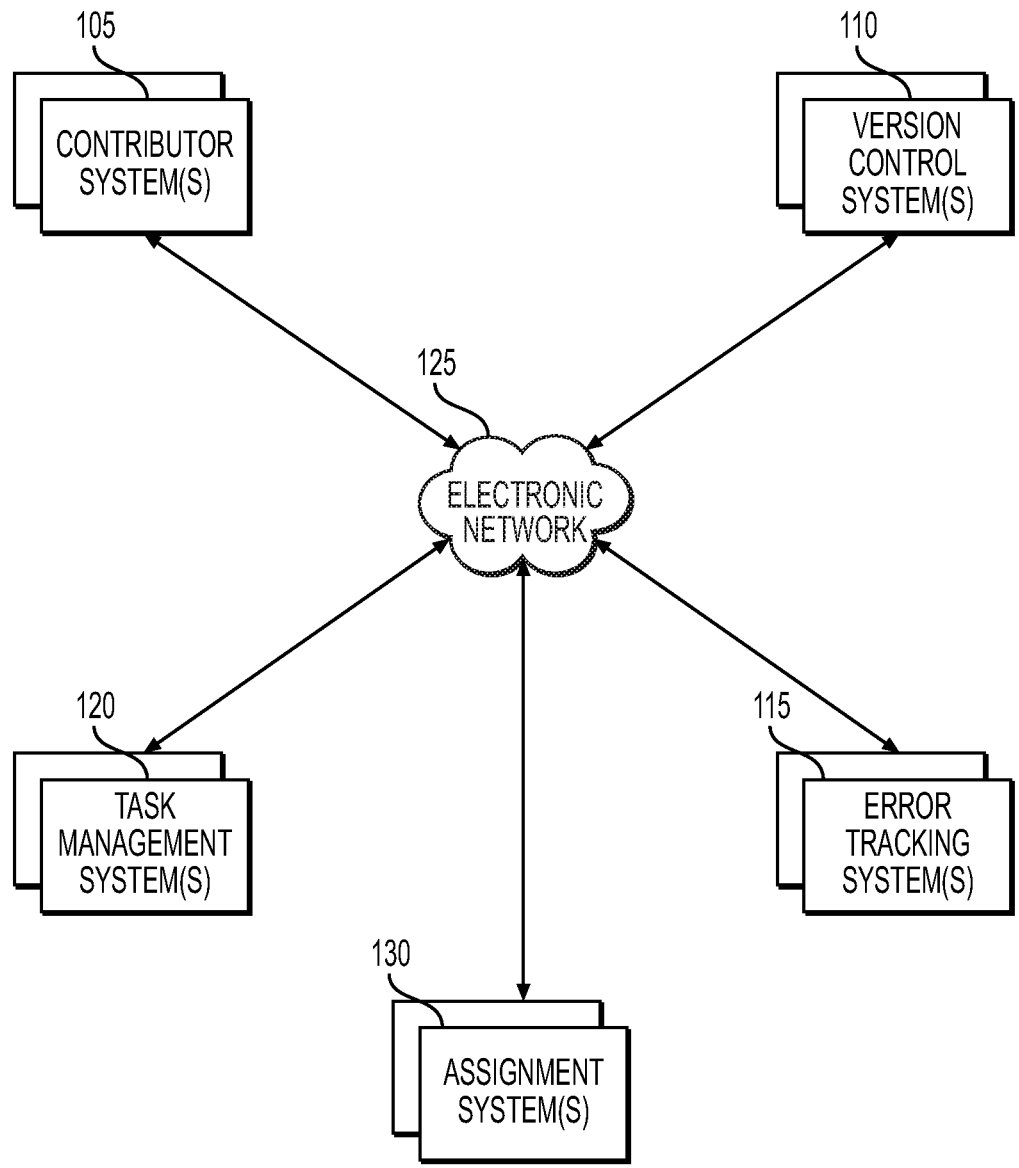
FIG. 1 depicts an exemplary client-server environment that may be utilized with techniques presented herein.

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "contributor" generally encompasses any individual who is software developer, coder, programmer, designer, architect, or any person involved in, familiar with, or associated with development of computer code. Moreover, an individual may be considered a "contributor" by virtue of an ability, capacity, or the like to assist with a coding project whether or not such assistance has yet to be provided.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

In general, the present disclosure provides methods and systems for managing software error resolution, and more particularly to methods and systems for optimizing assignment of contributors to address errors in computer code. As will be discussed below in more detail, in methods and systems according to the present disclosure, existing techniques may be improved.

For software coding projects that include multiple contributors, the selection of one or more contributors to address an error in the code may impact the overall workflow and work environment of the project. Selecting one or more contributors to address the error means balancing multiple factors such as, for example, how fast the error needs to be addressed, a risk metric associated with the error and/or portion(s) of code associated with the error (e.g., a risk due to attack, due to impact on the project or an associated organization, due to possible exposure of confidential or private information, etc.), a quality and/or completeness of the required fix, the workloads and efficiencies of the contributors, as well as the contributors' experience and familiarity with the code. Given the multitude of factors at play, making a selection that optimizes a fast, efficient, and complete resolution of the error without overburdening any contributors may be challenging. Moreover, when multiple portions of code or multiple coding projects are in development and/or are being supported simultaneously, this problem may compound.

An approach to ameliorate this issue includes using tools that attempt to present information related to software coding project development in a human-readable way. For example, version control tools have been developed in order to track how software code has been changed, by whom, and when. Debugging tools have been developed in order to facilitate identifying portions of computer code contributing to an error. Task management tools have been developed that track contributors workload and other statistics like average time to complete a task. However, even the information available via such tools may be inter-dependent, complex, or difficult to use in order to make optimal assignment selections. Accordingly, a need exists to improve the selection of contributors to assign to addressing errors in computer code.

FIG. 1 depicts an exemplary client-server environment that may be utilized with techniques presented herein. One or more contributor system(s) 105, one or more version control system(s) 110, one or more error tracking system(s) 115, one or more task management system(s) 120, and/or one or more assignment systems 130 may communicate across an electronic network 125. The systems of FIG. 1 may communicate in any arrangement. One or more of the systems of FIG. 1 may include a memory that stores at least a portion of a software coding project and/or other information associated with the software coding project.

The contributor system 105 may be associated with a contributor, e.g., an individual associated with or having a capacity to assist with a software coding project. The contributor system 105 may be associated with a group of contributors, a manager associated with managing one or more contributors, or the like. The version control system 110 may be configured to perform one or more tasks associated with tracking the development of the software coding project. For example, the version control system may be configured to track which portions of code in the project are revised, by whom, and when. In some embodiments, the version control system 110 may be configured to manage storage of various portions of the project on the memory of one or more of the systems of FIG. 1, to manage and record various versions of various portions of the project, and/or to manage and record a change log to various versions and portions of the project, or the like. In some embodiments, the version control system 110 may be configured to function as, manage, or operate in conjunction with a repository for storing materials associated with the project such as, for example, computer readable code, design materials, comments or documentary material, content data, metadata, or the like.

The error tracking system 115 may be configured to monitor execution of at least a portion of code associated with the project. In some embodiments, the error tracking system 115 may include, manage, or operate in conjunction with a system, environment, or the like for one or more of storing, compiling, executing, developing, revising, or debugging code. In some embodiments, the error tracking system 115 is configured to complete one or more of the following tasks: determine an occurrence of an error during an execution of computer-readable code; track, manage, retrieve, and/or store information associated with the error. Information associated with the error many include, for example, one or more of: at least a portion of the code associated with the error; portions of code affecting or affected by the at least portion of the code associated with the error; a line number of the code associated with the error; an error message, error flag information; or other information associated with the portion of the code associated with the error, such as information describing the portion of the code, the code, a repository or library including the code, the project, or a group or organization associated with the project; or the like.

The task management system 120 may be configured to track, record, and/or store information associated with tasks or acts performed or scheduled to be performed by one or more contributors. As used herein, the term "task" generally encompasses assignments, tickets assigned by a ticketing system or the like, scheduled events, deadlines, deliverables, etc. In some embodiments, the task management system 120 may be configured to track data related to completion of acts or tasks, such as categories and/or quantities of tasks completed by various contributors, quantities of time expended to complete various tasks, and the like. In some embodiments, the task management system 120 is configured to determine statistics based on the tracked data such as, for example, average time of each contributor to complete a task or to complete a particular type of task, average time for completion of a task or a particular type of task by contributors overall, an efficiency rating for each contributor for a task or a particular type of task, an average workload of each contributor, a current workload of each contributor, an average workload for contributors overall, or the like.

In some embodiments, the task management system 120 may be configured to categorize tasks into types. In some embodiments, the task management system 120 is configured to receive type categorizations for tasks, e.g., via manual user entry. In some embodiments, the task management system 120 is configured to categorize tasks into types via an automated process. For example, in some embodiments, a task may be categorized into a type based on an error message associated with the task. In some embodiments, the task management system 120 is configured to receive task category information from another system. For example, in some embodiments, the error tracking system 115 may be configured to determine a type of a detected error, e.g., based on an associated error message or other associated information.

As will be discussed herein, one or more assignment system(s) 130 may communicate with one or more of the contributor system 105, the version control system 110, the error tracking system 115, or the task management system 120 over the electronic network 130 to manage a resolution to an indication of an error in computer-readable code. In various embodiments, the assignment system 130 may determine an optimal selection of one or more contributors to assign to address an error in computer-readable code, cause the selected contributors to be assigned to the error, or transmit an indication of such assignment to the contributor system(s) 105 associated with the selected contributors.

In various embodiments, the electronic network 120 may be a wide area network ("WAN"), a local area network ("LAN"), personal area network ("PAN"), or the like. In some embodiments, electronic network 120 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

While FIG. 1 depicts the various systems as physically separate and communicating across network 120, in various embodiments, features of certain systems, for example the contributor system 105, the version control system 110, the error tracking system 115, the task management system 120, and/or the assignment system 130, may be incorporated partially or completely into any of the other systems of FIG. 1. Some or all of the functionality of a system may be incorporated into an internet browser extension or website page usable by a user. In some embodiments, a system, such as the contributor system 105 or error tracking system 115, for example, may include multiple devices. In one example, multiple contributor systems 105 interact with an online version control system that acts as a repository for at least a portion of code for a project, while the error tracking system 115 includes an online runtime environment for executing at least portions of the code. In another example, one or more of the systems from FIG. 1 are virtualized systems running online and in communication with one or more terminal systems.

In an exemplary use case, at least a portion of code for a project is executed in a runtime environment associated with the error tracking system 115, e.g., a debugging environment and/or a live environment monitored by the error tracking system 115. The error tracking system 115 monitors the execution of the at least portion of the code and, during the execution, identifies an occurrence of an error in the at least portion of the code. In various embodiments, such identification may be based on, for example, a halt in the execution of the code, an error message, an error flag, a result indicative of the occurrence of the error, or the like. In response to the identification of the occurrence of the error, the error tracking system 115 may initiate an error resolution process. Such an error resolution process may include retrieving information associated with the error, and transmitting a resolution request to the assignment system 130. Information associated with the error may include, for example, version information of the code, the portion of code associated with the error, the error message, revision history of the code, task management statistics for one or more contributors, urgency information associated with the error, etc.

As discussed in further detail below, in response to such a request, the assignment system 130, and/or the assignment system 130 operating in conjunction with one or more of the other systems from FIG. 1, may determine an optimal selection of one or more contributors to assign to the error, assign the selected contributor(s) to the error, and transmit a notification to the contributor system(s) 105 associated with the selected contributors that is indicative of the occurrence of the error and of the assignment, and that includes the information associated with the error.

Figure 2:
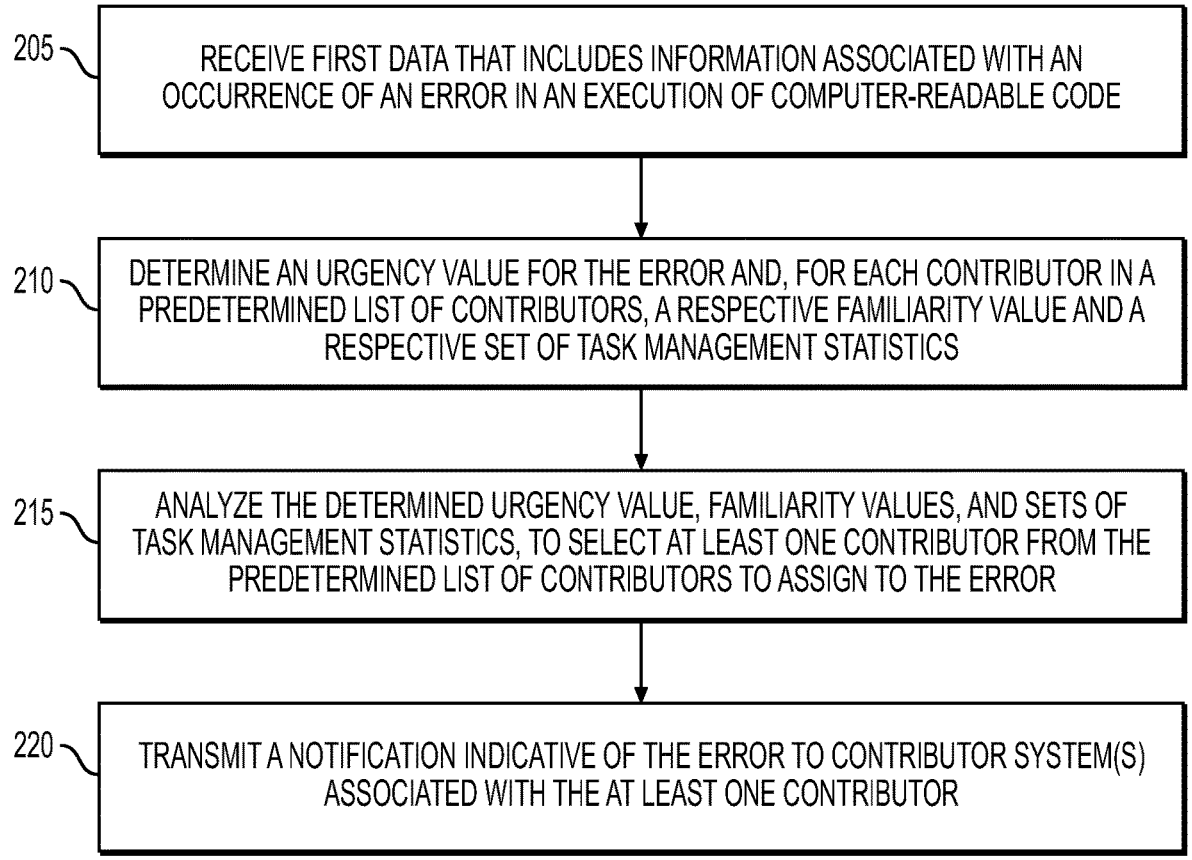
FIG. 2 depicts an exemplary embodiment of a process for managing error resolution using the environment of FIG. 1.

FIG. 2 illustrates an exemplary embodiment of a process for determining an optimal selection of one or more contributors to assign to address an error in computer-readable code. At step 205, the assignment system 130 may receive first data that includes information associated with an occurrence of an error in an execution of the computer-readable code. In some embodiments, the first data may be received from the error tracking system 115, e.g., via an error resolution request from the error tracking system 115. In some embodiments, the assignment system 130 may receive a request for an assignment to address the error, e.g., from a user associated with the task management system 120 and/or the contributor system 105, and may retrieve the first data from a memory associated with the error tracking system 115 or another system. In some embodiments, the assignment system 130 is configured to parse the received request to determine at least a portion of the information associated with the error such as, for example, the line of the code associated with the error, an error message associated with the error, or a version number of the code.

In some embodiments, the information associated with the error may include an identification of one or more of a portion of the code associated with the error, a first portion of the code affected by the portion of the code associated with the error, a second portion of the code that affects the portion of code associated with the error, a line number of the code associated with the error, a version number of the code, an error message associated with the error, or the like. In some embodiments, the first data may include one or more portions of code identified in the information associated with the error. In some embodiments, the first data may include information indicative of an urgency of the error.

At step 210, the assignment system 130 may determine an urgency value for the error and, for each contributor in a predetermined list of contributors, a respective familiarity value and a respective set of task management statistics.

In some embodiments, the information indicative of the urgency of the error received with the first data may include the urgency value, e.g., as may be determined by the error tracking system 115 or another system, or as may be determined by a user associated with the error tracking system 115 or another system. In some embodiments, the error tracking system 115, the assignment system 130, or both, may determine the urgency value based on the information indicative of the urgency of the error. Such information indicative of the urgency may include, but is not limited to: a proportion of the code affected by the error, whether the error caused the execution of the code to halt, a predetermined deadline for completion and/or delivery of the code, a type for the error, a predetermined importance value associated with at least the portion of the code associated with the error and/or the portions of code affected by or affecting the identified portion of code, or other factors.

In some embodiments, the determined urgency value may be associated with a quantitative value, e.g., a number on a predetermined scale. In some embodiments, the urgency value may be associated with a qualitative value, e.g., a qualification as one of "very urgent," "somewhat urgent," or "not urgent," or a corresponding schema such as a color in a range from red for very urgent to green for not urgent, etc. In some embodiments, the urgency value may include qualitative and quantitative aspects. For example, in some embodiments, portions of a predetermined scale for a quantitative urgency value may be associated with respective qualitative urgency values, e.g., a range of 0-3 corresponds to "not urgent," 4-7 corresponds to "urgent," and 8-10 corresponds to "very urgent," or the like.

In some embodiments, the assignment system 130 may retrieve the predetermined list of contributors from a memory associated with one or more of the version control system 110, the task management system 120, or another system. In some embodiments, the assignment system 130 may select one or more predetermined lists of contributors from amongst a set of predetermined lists. For example, in some embodiments, different predetermined lists may be associated with different portions of the code, different projects, different organizations, etc. In various embodiments, different predetermined lists are associated with code associated with the error at one or more of a repository level, a repository section level, a file level, a file section level, a code section level, or a code line level.

In some embodiments, the selection of the predetermined list(s) from the set may be based on the determined urgency value of the error. For example, in some embodiments, in response to the urgency score being within a first rage, the selected predetermined list may include a set of contributors who contributed to a portion of the code associated with the error. In some embodiments, in response to the urgency score being within a second range, the selected predetermined list may include a set of contributors who contributed to the code. In some embodiments, in response to the urgency score being within a third range, the selected predetermined list may include a set of contributors who contributed to further code affected by or effecting the code. In some embodiments, in response to the urgency score being within a fourth range, the selected predetermined list may include a set of contributors who have not contributed to the code, e.g., contributors not or not yet associated with the project, with an organization or team associated with the project, etc.

In some embodiments, the assignment system 130 may retrieve familiarity information associated with the contributors in the predetermined list of contributors. For example, in some embodiments, the assignment system 130 requests familiarity information from the version control system 110 and/or the task management system 120. In some embodiments, the assignment system 130 may retrieve revision history data from the version control system 110, e.g., data indicative of revisions made to at least a portion of the code, by whom, and when, and determines the familiarity information based on the revision history data. In some embodiments, the revision history may be associated with one or more of the line of the code associated with the error, the portion of the code associated with the error, the code, etc. In some embodiments, revision history data received from the version control system 110 includes a message indicating one or more contributors who revised the code, and/or timestamps for revisions.

In some embodiments, the assignment system 130 may retrieve familiarity information for the contributors in the predetermined list that is associated with other coding projects. For example, in an instance where the error identified in the execution of the code is of a particular type, the assignment system 130 may retrieve familiarity information for a contributor that addressed a similar error of the same type in a different project.

In various embodiments, the familiarity information for each contributor in the predetermined list of contributors may include one or more of: whether the contributor authored, modified, or otherwise contributed to the code; whether the contributor authored, modified, or otherwise contributed to the a portion of the code identified as associated with the error; a quantity of contributions made by the contributor to the code; a quantity of contributions made by the contributor to the identified portion of the code; a quantity of time since a previous contribution by the contributor to the code; a quantity of time since a previous contribution by the contributor to the identified portion of the code, types of errors previously addressed by the contributor, or the like.

In various embodiments, the assignment system 130 and/or another system may assign familiarity values to the contributors in the predetermined list by applying a predetermined set of familiarity rules or criteria that associate particular values to particular types of familiarity information. In an illustrative example, a predetermined list of contributors may include Person A, Person B, Person C, Person D, and Person E. Person A contributed to one or more portions of the code, but not to the portion of the code associated with the error, and is assigned a familiarity value of 3 on a scale of 1 to 5. Person B was the second to last person to edit the portion of the code associated with the error, and is assigned a familiarity value of 4. Person C was the last contributor to edit the portion of code associated with the error, and is assigned a familiarity value of 5. Person D had the highest number of edits to the identified portion of code, but was not the last or second to last editor, and is assigned a familiarity value of 4. Person E has not authored or edited any portion of the code, but has a recorded history of addressing errors of a same type as the error identified in the execution of the code, and is assigned a familiarity value of 3. Any acceptable set of rules or criteria, and any acceptable scale or range for the familiarity values may be used.

In some embodiments, the version control system 110, the assignment system 130, and/or another system may deploy a first machine learning model to determine the respective familiarity value for the contributors in the predetermined list of contributors based on the familiarity information. In some embodiments, the first machine learning model may be trained using one or more of the familiarity information, information associated with the work history and/or efficiency of the contributors (e.g., as discussed in further detail below), familiarity assessments received from the contributors that include contributor values of familiarity for various portions of code, or the like. In some embodiments, the first machine learning model is trained to determine a respective weight for one or more of the types of familiarity information discussed above, and to determine the respective familiarity value by applying the determined weights to the corresponding familiarity information. Any acceptable type of machine learning model may be used.

In some embodiments, the assignment system 130 may retrieve the respective set of task management statistics from the task management system 120. For example, in some embodiments, the task management system 120 includes a software coding tracking tool such as an agile and/or waterfall methodology production tool configured to track production metrics and/or other data, and the assignment system 130 is configured to retrieve the metrics and/or other data from the production tool in order to determine the respective set of task management statistics In some embodiments, the assignment system 130 may transmit a request to the task management system 120 that includes the type of the error and the predetermined list of contributors.

In some embodiments, the task management system 120 may be configured to determine the respective set of task management statistics of a respective contributor based on tracked task information in response to receiving a request from the assignment system 130. In some embodiments, the assignment system 130 may retrieve tracked task information for the contributors on the predetermined list, and determine the set of task management statistics based on the retrieved tracked task information.

In various embodiments, the respective set of task management statistics for each contributor in the predetermined list may include one or more of: a current workload value for the contributor; general resolution information such as an estimated quantity of time for the contributor to address the error; or specific resolution information such as an efficiency value of the contributor at addressing the error. In some embodiments, the current workload value may be a value indicative of the current number of tasks, tickets, acts, or the like assigned to the contributor.

In some embodiments, the current workload value may be a value indicative of an amount of time estimated for the contributor to address all of the tasks, tickets, acts, or the like currently assigned to the contributor. In some embodiments, the current workload value may be a value indicative of a bandwidth of the contributor to take on more work, e.g., a value indicative of a number of assigned tasks subtracted from a nominal work capacity value.

In some embodiments, the estimated quantity of time for the contributor to address the error may be based on one or more records of the contributor addressing an error of the same type as the error identified in the execution of the code. As noted above, the type of the error may be identified and/or by the error tracking system 115 or another system. In some embodiments, the estimate may be based on an average value of completion time from the one or more records. In some embodiments, the estimate may be based on the information associated with the error, e.g., the portions of code affected by or affecting the identified portion of the code associated with the error, etc.

In some embodiments, the efficiency value may be based on a comparison between the estimated quantity of time for the contributor to address the error and an average estimated quantity of time to address the error. In some embodiments, the average estimated quantity of time to address the error may based on the estimated quantities of times for at least a portion of the contributors on the predetermined list. In various embodiments, the average estimated quantity may be based on the estimated quantities of contributors that have contributed to the identified portion of the code, the code, errors of the same type, of contributors within the organization associated with the project, etc. In some embodiments, the average estimated quantity may be predetermined, e.g., based on information submitted by a user.

At step 215, the assignment system 130 may analyze various information and data, e.g., the determined urgency value, familiarity values, and sets of task management statistics, to select at least one contributor from the predetermined list of contributors to assign to the error.

In some embodiments, the assignment system 130 may determine first weights for the contributors based on one or more of the familiarity scores and the revision history of the code, determine second weights for the contributors based on the task management statistics, and determine third weights for the contributors based on the urgency value. In some embodiments, the assignment system 130 may perform a ranking process to determine a ranked set of contributors based on the first weights, second weights, and third weights. In some embodiments, the assignment system 130 may select a predetermined number of highest-ranked contributors in the ranked set as the contributors to be assigned to the error. In some embodiments, the ranking process may include summing the first weights, the second weights, and the third weights to determine a set of scores for the predetermined list of contributors, and ordering the predetermined list of contributors based on the set of scores to determine the ranked set. While the embodiments discussed above include three set of weights, other embodiments may include more or fewer sets of weights. For example, in some embodiments, the contributors are not assigned weights based on the urgency value. Some embodiments may not include sets of weights.

In some embodiments, the assignment system 130 may assemble one or more of information associated with the error, the revision history, the task management statistics for the first set of contributors, and the urgency value into a feature vector, process the feature vector through a ranking machine learning model to obtain scores for the predetermined list of contributors; order the predetermined list of contributors based on the scores to obtain a second set of contributors; and select a top pre-determined number from the predetermined list of contributors as the one or more contributors to address the error.

In some embodiments, the assignment system 130 may use an optimization model to select at least one contributor from the predetermined list of contributors to assign to the error. The optimization model may be based on the urgency value of the error, and the respective familiarity values and the respective set of task management statistics for each contributor. Any acceptable type of optimization model and/or criteria for optimization may be used.

For example, in some embodiments, the optimization model is configured to make a selection of one or more contributors to assign to the error that optimizes for familiarity of the selected contributor(s) without raising the current workload value of the selected contributor(s) over a predetermined threshold. In some embodiments, the optimization model is configured to make a selection of one or more contributors to assign to the error that optimizes for minimized quantity of time to address the error. In some embodiments, the optimization model is configured such that a relatively higher urgency value causes the optimization model to optimize the selection more toward a lower current workload value for the selected contributor(s). In some embodiments, the optimization model is configured such that a relatively lower urgency value causes the optimization model to optimize the selection more toward a higher respective familiarity value for the selected contributor(s).

In some embodiments, the assignment system 130 may be configured to tune the optimization based on the information associated with the error. In some embodiments, the assignment system 130 may be configured to enable a user to selectively tune the optimization model toward optimization of one or more parameters.

In some embodiments, the optimization model may include a second machine learning model. In some embodiments the second machine learning model may be trained (e.g., based on the information provided to the optimization model, data associated with assignments of contributors to various errors, and data associated with results of such assignments) to make the optimal selections of the contributor(s) to assign to the error. In some embodiments, the second machine learning model may be trained to tune the optimization model (e.g., based on the information associated with the error and data associated with errors of the same type). Any acceptable type of machine learning model and/or machine learning techniques is usable.

In some embodiments, the optimization model may result in the selection of no contributors. For example, in an embodiment in which the optimization model is configured to not assign the error to any contributor with a current workload value above a predetermined threshold, all of the contributors on the predetermined list may have current workload value above the predetermined threshold. In some embodiments, in response to no contributors being selected by the optimization model, the assignment system 130 may be configured to retune the optimization model and repeat step 210. For example, in some embodiments, the assignment system 130 may be configured to adjust the predetermined threshold for the current workload value, adjust the urgency value for the error, adjust the selection of the predetermined list of contributors, adjust the type of the error, or the like. In some embodiments, the assignment system 130 may be configured to modify the weight in the optimization model given to one or more parameters, or remove one or more parameters from the optimization model. In some embodiments, the assignment system 130 may be configured to wait a predetermined period of time before repeating step 210 instead of or in addition to retuning the optimization model.

In some embodiments, the assignment system 130 may be configured to select a particular quantity of contributors for the error. The particular quantity may be based on one or more of the type of the error, the urgency value of the error, or other factors. In some embodiments, the particular quantity is received from a user. In response to the optimization model selecting less than the particular quantity of contributors, the assignment system 130 may be configured to repeat step 210 as discussed above, proceed with the selection of less than the particular quantity of contributors, and/or request instructions from the user and proceeding with one of the foregoing options based on a response from the user.

At step 220, the assignment system 130 may transmit a notification indicative of the error to the contributor system(s) 105 associated with the contributor(s) assigned to the error. In some embodiments, the notification may include one or more of the information associated with the error, the identified portion of the code associated with the error, the portion(s) of code affected by or affecting the identified portion of code, the version number of the code, the line number of the error, error message data associated with the error, the urgency value of the error, etc. In some embodiments, the assignment system 130 transmits the notification, the information associated with the error, and/or information indicative of the assignment of contributors to the task management system 120. For example, in some embodiments, the task management system 120 includes a scheduling tool or production management tool that may be updated based on the transmission from the assignment system 130.

In some embodiments, the assignment system 130 may be configured to generate a report, e.g., an error report. In some embodiments, the generated report integrates at least a portion of the information discussed above for step 220 into the portion of the code associated with the error. For example, in some embodiments, the report generated by the assignment system 130 includes not only the portion of code associated with the error, but also contextual information for the error such as, for example, an indication of how the error may affect other portions of the code, the error message associated with the error, or the revision history of the portion of the code associated with the error. In some embodiments, the notification transmitted to the contributor system(s) 105 may include the generated report. Providing the assigned contributor(s) with some or all of the information needed to address the error may remove or reduce the need for the contributor(s) to access materials and/or familiarize themselves with the error, and/or reduce the quantity of time needed to address the error.

Additional features are discussed in the further exemplary embodiments below.

In some embodiments, a computer-implemented method may include: receiving first data that includes information associated with an error in an execution of code; based on the first data, determining: for each contributor in a predetermined list of contributors: a respective familiarity value indicative of an amount of association between the contributor and the error in the code; and a respective set of task management statistics; and an urgency value of the error; using an optimization model, selecting at least one contributor from the predetermined list of contributors to assign to the error, the optimization model based on the respective familiarity values and the respective sets of task management statistics for each contributor, and the urgency value of the error; and transmitting a notification indicative of the error to a computing device associated with the at least one contributor assigned to the error.

In some embodiments, the information associated with the error includes an identification of a portion of the code associated with the error; and the respective familiarity value is based on familiarity information related to one or more of: whether the contributor contributed to the code; whether the contributor contributed to the identified portion of the code; a quantity of contributions made by the contributor to the code; a quantity of contributions made by the contributor to the identified portion of the code; a quantity of time since a previous contribution by the contributor to the code; or a quantity of time since a previous contribution by the contributor to the identified portion of the code.

In some embodiments, the method further includes: using a machine learning model to determine the respective familiarity value based on the familiarity information.

In some embodiments, the respective set of task management statistics includes one or more of: a current workload value for the contributor; an estimated quantity of time for the contributor to address the error; or an efficiency value of the contributor at addressing the error based on a comparison between the estimated quantity of time for the contributor to address the error and an average estimated quantity of time to address the error, the average estimated quantity of time to address the error based on the estimated quantities of time for at least a portion of the contributors on the predetermined list of contributors.

In some embodiments, the optimization model is configured such that a relatively higher urgency value causes the optimization model to optimize the selection more toward a lower current workload value for the selected at least one contributor.

In some embodiments, the optimization model is configured such that a relatively lower urgency value causes the optimization model to optimize the selection more toward a higher respective familiarity value for the selected at least one contributor.

In some embodiments: the information associated with the error includes an identification of a portion of the code associated with the error; the method further includes retrieving at least the identified portion of the code; and the notification indicative of the error includes the retrieved code.

In some embodiments: the information associated with the error includes a version number of the code, a line number of the code associated with the error, and error message data associated with the error; and the notification indicative of the error includes the information associated with the error.

In some embodiments, the method further includes: generating a report that integrates the information associated with the error into the retrieved portion of the code; wherein the notification indicative of the error includes the generated report.

In some embodiments, the retrieved code includes the portion of the code associated with the error, and one or more of: a first portion of the code affected by portion of the code associated with the error; and a second portion of the code that affects the portion of the code associated with the error.

In some embodiments, the method further includes selecting the predetermined list of contributors from amongst a set of predetermined lists based on the urgency value of the error.

In some embodiments, one or more of: in response to the urgency score being within a first rage, the selected predetermined list includes a set of contributors who contributed to a portion of the code associated with the error; in response to the urgency score being within a second range, the selected predetermined list includes a set of contributors who contributed to the code; in response to the urgency score being within a third range, the selected predetermined list includes a set of contributors who contributed to further code affected by or effecting the code; or in response to the urgency score being within a fourth range, the selected predetermined list includes a set of contributors who have not contributed to the code.

In some embodiments, the optimization model includes a machine learning model.

Figure 3:
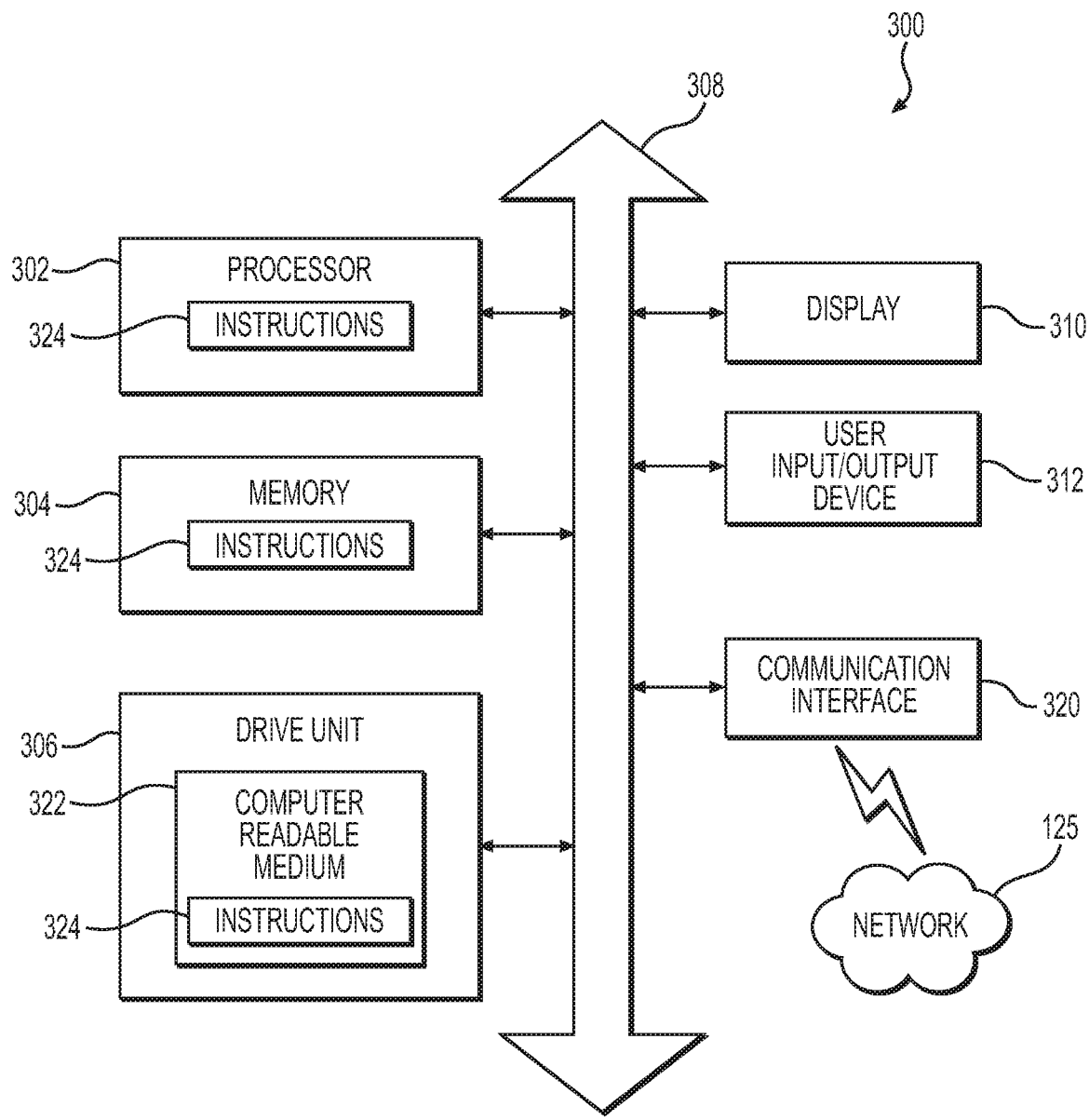
FIG. 3 depicts an example of a computing device, according to aspects of the present disclosure.

FIG. 3 is a simplified functional block diagram of a computer 300 that may be configured as a device for executing the methods of FIG. 2, according to exemplary embodiments of the present disclosure. FIG. 3 is a simplified functional block diagram of a computer that may be configured as the assignment system 130 according to exemplary embodiments of the present disclosure. In various embodiments, any of the customer systems, vender systems, shipper systems, payment processors, etc., discussed herein may be an assembly of hardware 300 including, for example, a data communication interface 320 for packet data communication. The platform also may include a central processing unit ("CPU") 302, in the form of one or more processors, for executing program instructions. The platform may include an internal communication bus 308, and a storage unit 306 (such as ROM, HDD, SDD, etc.) that may store data on a computer readable medium 322, although the system 300 may receive programming and data via network communications. The system 300 may also have a memory 304 (such as RAM) storing instructions 324 for executing techniques presented herein, although the instructions 324 may be stored temporarily or permanently within other modules of system 300 (e.g., processor 302 and/or computer readable medium 322). The system 300 also may include input and output ports 312 and/or a display 310 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the process shown in FIG. 2, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method for managing debugging, comprising:
monitoring execution of a code to detect an error in the code;
in response to the monitoring detecting the error in the code, initiating an error resolution process to identify one or more contributors to address the error, the error resolution process including:
obtaining information associated with the error;
obtaining revision history for the code from a version control system;
obtaining a predetermined list of contributors associated with the code;
obtaining task management statistics information for the predetermined list of contributors from a task management system;
obtaining an urgency value for the error; and
analyzing the information associated with the error, the revision history, the task management statistics, and the urgency value to determine the one or more contributors to address the error;
generating an error report for the error; and
transmitting the error report to the identified one or more contributors.

2. The method of claim 1, wherein the monitoring the execution of the code to detect the error in the code includes:
executing the code;
determining whether one or more failures or error flags in the code have been triggered; and
in response to determining that the one or more failures or error flags have been triggered, detecting the error in the code as associated with the one or more triggered failures or error flags.

3. The method of claim 1, wherein the initiating the error resolution process includes:
obtaining a line of the error and an error message associated with the error;
identifying a version of the code; and
transmitting an error resolution process request to an assignment system that executes the error resolution process.

4. The method of claim 1, wherein:
the obtaining the information associated with the error includes parsing an error resolution process request to extract a line of the error and an error message associated with the error, and extracting a version number of the code; and the obtaining the revision history for the code from the version control system includes:
  requesting, from the version control system, the revision history for the line of code for the version number of the code, and
  receiving a revision history message from the version control system, the revision history message indicating one or more contributors of the code and timestamps of changes to the code for the one or more contributors.

5. The method of claim 4, wherein the obtaining the predetermined list of contributors associated with the code includes:
  obtaining first contributor information and/or second contributor information by:
    requesting, from the version control system, first contributor information, the first contributor information including first contributor(s) associated with the code at one or a combination of: a repository level, a section level for a section of the repository that includes the code, a file level for a file that includes the code, a file section level for a section of the file that includes the code, and/or a line level for the line of the error; and/or
    requesting, from the task management system, second contributor information, the second contributor information including second contributor(s) associated with an organization and/or teams within the organization; and
  forming the predetermined list of contributors based on the one or more contributors, the first contributor information and/or the second contributor information.

6. The method of claim 5, wherein the obtaining the task management statistics for the first set of contributors from the task management system includes:
  transmitting a request for statistics, the request including an indication of the first set of contributors and a type of the error; and
  receiving a statistics message from the task management system, the statistics message including current workload value information, general resolution information, and/or specific resolution information, the current workload value indicative of a current workload of the first set of contributors, the general resolution information including an indication of expected time to address the error based on the type of the error, the specific resolution information including an indication of times for members of the first set of contributors that have addressed errors of the type of the error.

7. The method of claim 6, wherein the obtaining the urgency value includes parsing the error resolution process request to extract an urgency value, or determining the urgency value based on a priority of the code and/or the type of the error.

8. The method of claim 7, wherein the analyzing the information associated with the error, the revision history, the task management statistics for the first set of contributors, and the urgency value to determine the one or more contributors to address the error includes:
  processing the revision history to determine first weights for the one or more contributors;
  processing the task management statistics to determine second weights for the first set of contributors;
  processing the urgency value to determine third weights for the first set of contributors;
  performing a ranking process to form a ranked set of contributors from the predetermined list of contributors, based on the first weights, the second weights, and the third weights; and
  selecting a top pre-determined number from the ranked set of contributors as the one or more contributors to address the error.

9. The method of claim 8, wherein the ranking process includes:
  summing the first weights, the second weights, and the third weights to obtain scores for the predetermined list of contributors; and
  ordering the predetermined list of contributors based on the scores to obtain the second set of contributors.

10. The method of claim 7, wherein the analyzing the information associated with the error, the revision history, the task management statistics for the first set of contributors, and the urgency value to determine the one or more contributors to address the error includes:
  processing the information associated with the error, the revision history, the task management statistics for the predetermined list of contributors, and the urgency value to generate a feature vector;
  processing the feature vector through a ranking machine learning model to obtain scores for the predetermined list of contributors;
  ordering the predetermined list of contributors based on the scores to obtain a ranked set of contributors; and
  selecting a top pre-determined number from the ranked set of contributors as the one or more contributors to address the error.

11. A system for managing debugging, the system comprising:
  a memory storing instructions; and
  a processor executing the instructions to perform a process including:
    monitoring execution of a code to detect an error in the code;
    in response to the monitoring detecting the error in the code, initiating an error resolution process to identify one or more contributors to address the error, the error resolution process including:
      obtaining information associated with the error;
      obtaining revision history for the code from a version control system;
      obtaining a predetermined list of contributors associated with the code;
      obtaining task management statistics information for the predetermined list of contributors from a task management system;
      obtaining an urgency value for the error; and
      analyzing the information associated with the error, the revision history, the task management statistics, and the urgency value to determine the one or more contributors to address the error;
    generating an error report for the error; and
    transmitting the error report to the identified one or more contributors.

12. The system of claim 11, wherein the process further includes, to monitor the execution of the code to detect the error in the code:
  executing the code;
  determining whether one or more failures or error flags in the code have been triggered; and in response to determining that the one or more failures or error flags have been triggered, detecting the error in the code as associated with the one or more triggered failures or error flags.

13. The system of claim 11, wherein the process further includes, to initiate the error resolution process:
obtaining a line of the error and an error message associated with the error;
identifying a version of the code; and
transmitting an error resolution process request to an assignment system that executes the error resolution process.

14. The system of claim 11, wherein the error resolution process further includes:
to obtain the code error information parsing an error resolution process request to extract a line of the error and an error message associated with the error, and extracting a version number of the code; and
to obtain the revision history for the code from the version control system:
requesting, from the version control system, the revision history for the line of code for the version number of the code, and
receiving a revision history message from the version control system, the revision history message indicating one or more contributors of the code and timestamps of changes to the code for the one or more contributors.

15. The system of claim 14, wherein the error resolution process further includes, to obtain the predetermined list of contributors associated with the code:
obtaining first contributor information and/or second contributor information by:
requesting, from the version control system, first contributor information, the first contributor information including first contributor(s) associated with the code at one or a combination of: a repository level, a section level for a section of the repository that includes the code, a file level for a file that includes the code, a file section level for a section of the file that includes the code, and/or a line level for the line of the error; and/or
requesting, from the task management system, second contributor information, the second contributor information including second contributor(s) associated with an organization and/or teams within the organization; and
forming the predetermined list of contributors based on the one or more contributors, the first contributor information and/or the second contributor information.

16. The system of claim 15, wherein the error resolution process further includes, to obtain the task management statistics for the first set of contributors from the task management system:
transmitting a request for statistics, the request including an indication of the first set of contributors and a type of the error; and
receiving a statistics message from the task management system, the statistics message including current workload value information, general resolution information, and/or specific resolution information, the current workload value indicative of a current workload of the first set of contributors, the general resolution information including an indication of expected time to address the error based on the type of the error, the specific resolution information including an indication of times for members of the first set of contributors that have addressed errors of the type of the error.

17. The system of claim 16, wherein the error resolution process further includes, to obtain the urgency factor information:
parsing the error resolution process request to extract an urgency value, or determining the urgency value based on a priority of the code and/or the type of the error.

18. The system of claim 17, wherein the error resolution process further includes, to analyze the information associated with the error, the revision history, the task management statistics for the first set of contributors, and the urgency value to determine the one or more contributors to address the error:
processing the revision history to determine first weights for the one or more contributors;
processing the task management statistics to determine second weights for the first set of contributors;
processing the urgency value to determine third weights for the first set of contributors;
performing a ranking process to form a second set of contributors from the first set of contributors, based on the first weights, the second weights, and the third weights; and
selecting a top pre-determined number from the second set of contributors as the one or more contributors to address the error.

19. The system of claim 17, wherein the error resolution process further includes, to analyze the information associated with the error, the revision history, the task management statistics for the first set of contributors, and the urgency value to determine the one or more contributors to address the error:
processing the information associated with the error, the revision history, the task management statistics for the first set of contributors, and the urgency value to generate a feature vector;
processing the feature vector through a ranking machine learning model to obtain scores for the first set of users;
ordering the first set of contributors based on the scores to obtain a second set of contributors; and
selecting a top pre-determined number from the second set of contributors as the one or more contributors to address the error.

20. A method for managing debugging, the method comprising:
monitoring execution of a code to detect an error in the code;
in response to the monitoring detecting the error in the code, initiating an error resolution process to identify one or more contributors to address the error based on revision history associated with the code, the error resolution process including:
analyzing, by performing a ranking process or using a ranking machine learning model, the revision history, task management statistics for a predetermined list of contributors, and an urgency value to determine the one or more contributors to address the error;
generating an error report; and
transmitting the error report to the identified one or more contributors.

* * * * *